(12) United States Patent
Johnson et al.

(10) Patent No.: US 12,187,223 B2
(45) Date of Patent: Jan. 7, 2025

(54) SHARED VEHICLE DOOR LOCK CONTROL SYSTEMS AND METHODS

(71) Applicants: DENSO International America, Inc., Southfield, MI (US); DENSO CORPORATION, Kariya (JP)

(72) Inventors: Matthew Johnson, Royal Oak, MI (US); Martin Nespolo, Grosse Pointe Woods, MI (US); Thomas Krzyzak, Livonia, MI (US); Sibu Varughese, Sterling Heights, MI (US); Wilson Yim, Ann Arbor, MI (US); Ginelle Margaret Reed, Novi, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 109 days.

(21) Appl. No.: 17/991,389

(22) Filed: Nov. 21, 2022

(65) Prior Publication Data

US 2024/0166163 A1 May 23, 2024

(51) Int. Cl.
*B60R 25/01* (2013.01)
*B60R 25/24* (2013.01)

(52) U.S. Cl.
CPC .............. *B60R 25/01* (2013.01); *B60R 25/24* (2013.01); *B60R 2325/10* (2013.01)

(58) Field of Classification Search
CPC ......... B60R 25/01; B60R 25/24; B60R 25/23; G06Q 50/30; H04W 4/008
See application file for complete search history.

(56) References Cited

U.S. PATENT DOCUMENTS

| 8,299,894 | B1 | 10/2012 | Semeniuk |
| 9,701,281 | B2 * | 7/2017 | Reiser ................... G06Q 30/016 |
| 2018/0338241 | A1 * | 11/2018 | Li ............................ H04W 4/40 |
| 2021/0039593 | A1 * | 2/2021 | Lutterbeck ......... G07C 9/00571 |
| 2022/0108574 | A1 * | 4/2022 | Buttolo .............. G07C 9/00563 |

FOREIGN PATENT DOCUMENTS

| CN | 104627021 | B | 8/2016 |
| GB | 2596113 | A | 12/2021 |
| JP | 2017141561 | A | 8/2017 |

* cited by examiner

*Primary Examiner* — Vernal U Brown
(74) *Attorney, Agent, or Firm* — Harness, Dickey & Pierce, P.L.C.

(57) ABSTRACT

A lock control system includes: an automatic door lock configured to unlock and lock a door of a vehicle; a wireless transceiver configured to wirelessly receive a first unique identifier for a period of use of the vehicle by a non-owner of the vehicle from a server that is remote from the vehicle; an input device configured to capture a second unique identifier output by an electronic device through a glass component of the vehicle; and a lock control module configured to: compare the first unique identifier with the second unique identifier; and selectively actuate the automatic door lock thereby unlocking the door in response to a determination that the second unique identifier is the same as the first unique identifier.

14 Claims, 4 Drawing Sheets

SHARED VEHICLE DOOR LOCK CONTROL SYSTEMS AND METHODS

FIELD

The present disclosure relates to shared vehicles and more particularly to systems and methods for controlling unlocking of doors of shared vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles are used to transport people and goods from place to place. Various different types of vehicles are available, such as trucks, multiple different types of utility vehicles, sedans, coupes, convertibles, etc.

Some vehicles may be owned and used by only one or more people. Other vehicles may be used for carsharing (also referred to as ridesharing). Multiple different types of carsharing are available, such as vehicle rentals, ride hailing, peer to peer car rental, commercial truck rentals, etc. In ride hailing, a driver of a vehicle verifies a rider's identity by asking the rider for his or her name and matching the given name to a name on a ride reservation. For other forms of carsharing, however, a driver or owner of the vehicle may not be present to verify identity.

SUMMARY

In a feature, a lock control system includes: an automatic door lock configured to unlock and lock a door of a vehicle; a wireless transceiver configured to wirelessly receive a first unique identifier for a period of use of the vehicle by a non-owner of the vehicle from a server that is remote from the vehicle; an input device configured to capture a second unique identifier output by an electronic device through a glass component of the vehicle; and a lock control module configured to: compare the first unique identifier with the second unique identifier; and selectively actuate the automatic door lock thereby unlocking the door in response to a determination that the second unique identifier is the same as the first unique identifier.

In further features, the first and second unique identifiers are visual identifiers.

In further features, the first and second unique identifiers are QR (quick response) codes.

In further features, the electronic device is included and is configured to display the second unique identifier on a display of the electronic device, and where the input device is a camera.

In further features, the first and second unique identifiers are audible identifiers.

In further features, the first and second unique identifiers include sounds.

In further features, the electronic device is included and is configured to output the second unique identifier from a speaker of the electronic device, where the input device includes a microphone.

In further features, the first and second unique identifiers are haptic identifiers.

In further features, the first and second unique identifiers include vibration patterns.

In further features, the electronic device is included and is configured to output the second unique identifier from a vibrating device of the electronic device, where the input device includes a microphone.

In further features, the glass component is one of a window and a windshield of the vehicle.

In further features, the lock control module is configured to selectively actuate the automatic door lock thereby unlocking the door in response to a determination that the second unique identifier is the same as the first unique identifier and a present date and time is within a predetermined date and time range for the period of use of the vehicle by the non-owner of the vehicle.

In a feature, a lock control method includes: by an automatic door lock of a vehicle, selectively unlocking and locking a door of the vehicle; by a wireless transceiver, wirelessly receiving a first unique identifier for a period of use of the vehicle by a non-owner of the vehicle from a server that is remote from the vehicle; by an input device, capturing a second unique identifier output by an electronic device through a glass component of the vehicle; comparing the first unique identifier with the second unique identifier; and selectively actuating the automatic door lock thereby unlocking the door in response to a determination that the second unique identifier is the same as the first unique identifier.

In further features, the first and second unique identifiers are visual identifiers.

In further features, the first and second unique identifiers are QR (quick response) codes.

In further features, the lock control method further includes, by the electronic device, displaying the second unique identifier on a display of the electronic device, where the input device is a camera.

In further features, the first and second unique identifiers are audible identifiers.

In further features, the first and second unique identifiers include sounds.

In further features, the lock control method further includes, by the electronic device, outputting the second unique identifier from a speaker of the electronic device, where the input device includes a microphone.

In further features, the first and second unique identifiers are haptic identifiers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The key or key fob used to start and drive a shared vehicle may be left in a glove box, console, or elsewhere within a passenger cabin of the vehicle. One or more doors of the shared vehicle could be left unlocked for use of the shared vehicle to access the key or key fob. Leaving one or more doors unlocked and the key or key fob within the shared vehicle, however, allows for the possibility of an unauthorized user to enter and drive the shared vehicle.

The present application enables the key or key fob to be left within the vehicle and all of the doors of the vehicle to be locked with the key or key fob inside. A user of the shared vehicle arranges for a period of use of the shared vehicle with a server using an electronic device, such as a cell phone, a tablet device, a smart watch, etc. The server transmits a unique identifier to the electronic device. The unique identifier may be a visual identifier (e.g., a quick response (QR) code), an audible identifier (e.g., a sound pattern/profile), a haptic identifier (e.g., a vibration pattern/profile), etc.

The server also transmits the unique identifier to the shared vehicle. The shared vehicle includes an input device (e.g., a camera for visual identifiers, or a microphone for audible or haptic identifiers) that captures unique identifiers through glass of the shared vehicle, such as a window or a wind shield. The electronic device outputs the unique identifier received from the server when the electronic device is on or near the glass. If the unique identifier on the electronic device captured using the input device is the same as the unique identifier received from the server and the present date and time are within the period of use of the shared vehicle, a lock control module of the vehicle may automatically unlock one or more doors of the vehicle. This allows the user to enter the vehicle, obtain the key or key fob, and drive the vehicle. This also allows the shared vehicle to be completely locked with the key or key fob inside the vehicle.

Figure 1:
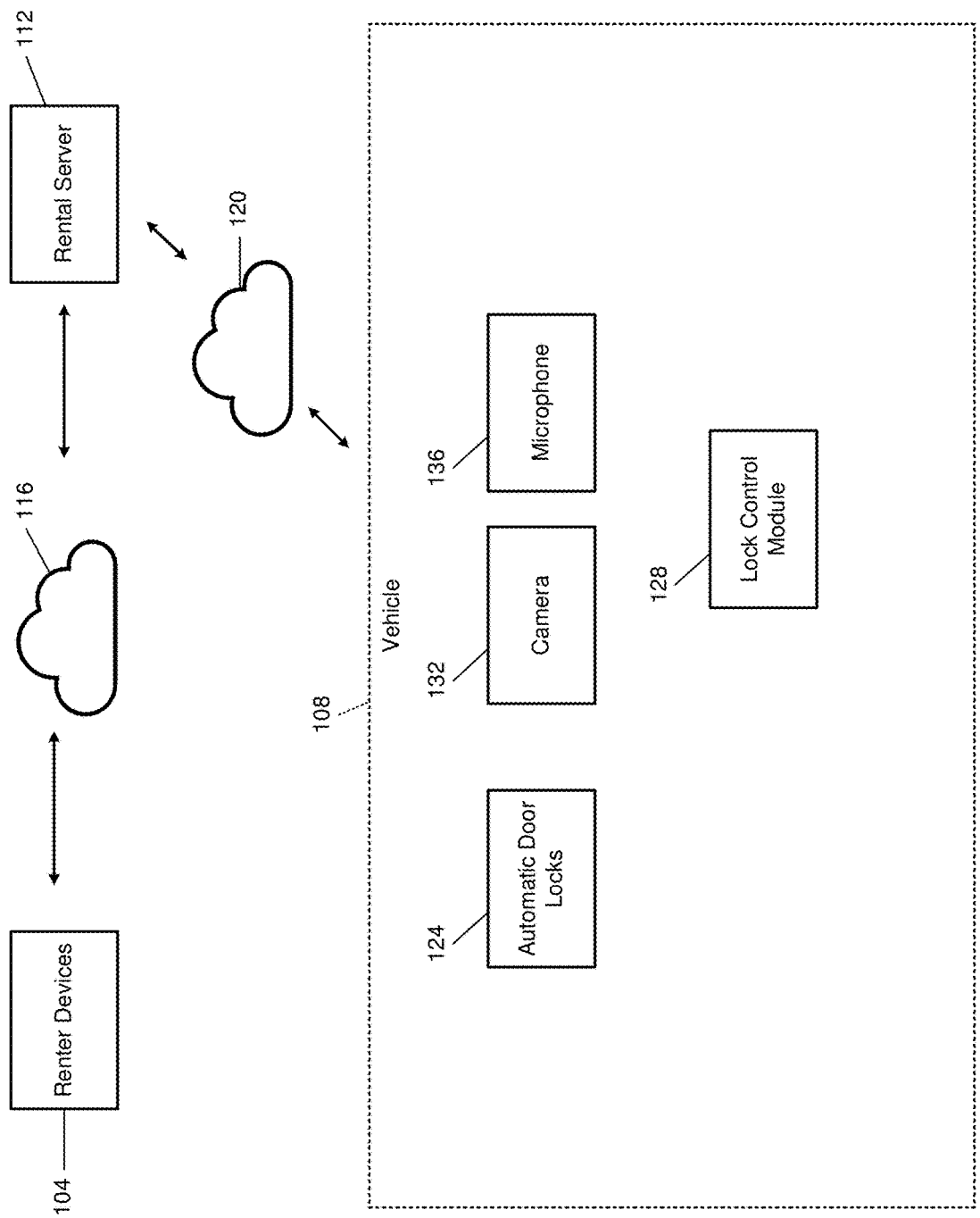
FIG. 1 is a functional block diagram of an example implementation of a vehicle rental system.

FIG. 1 includes a functional block diagram of an example implementation of a vehicle rental system. Vehicle renters can rent vehicles, such as vehicle 108, via renter computing devices 104. Examples of renter computing devices include cellular (smart) phones, tablet devices, laptop computers, and other types of computing devices.

One or more rental servers, such as rental server 112, manage vehicles that are available for rental, dates and times when the vehicles are available for rental, etc. The rental devices 104 communicate with the rental server(s) via a network 116, such as the Internet, to rent vehicles, such as the vehicle 108.

Via a renter device, a renter of a vehicle may reserve the vehicle 108 for rental for a rental period with the rental server 112. The rental period is a period of time. The renter or an owner or manager of the vehicle may specify where pickup of the vehicle 108 is to occur by the renter. The rental server 112 may manage payment for the rental by the renter, payment for the rental to an owner or manager of a vehicle rented, and one or more other aspects of the rental.

One or more keys and/or key fobs for starting and using a rented vehicle could be left within a rental vehicle (e.g., within a glove box or console) with one or more doors of the vehicle unlocked for a renter. This, however, enables the possibility of someone other than the renter of the vehicle accessing and possibly driving the vehicle.

The present application involves systems and methods for ensuring that only a renter of a rental vehicle can enter and use the rental vehicle. The rental vehicles communicate with the rental server 112 via a network 120, such as the Internet. While the example of the vehicle 108 will be described, each rental vehicle may function similarly and include the same components.

The vehicle 108 includes automatic door locks 124 that actuate and lock and unlock exterior doors, respectively, to a passenger cabin of the vehicle 108. A lock control module 128 may actuate the automatic door locks 124 and lock or unlock one or more of the doors in response to user input to one or more unlock/lock switches or buttons within the passenger cabin. The lock control module 128 may actuate the automatic door locks 124 and lock or unlock one or more of the doors in response to user input to one or more unlock/lock switches or buttons located on an exterior of the vehicle, such as when a key fob is within a predetermined distance of the exterior of the vehicle. The lock control module 128 may actuate the automatic door locks 124 and lock or unlock one or more of the doors in response to user input to one or more unlock/lock switches or buttons located on an exterior of the vehicle, such as when a key fob is within a predetermined distance of the exterior of the vehicle. The lock control module 128 may actuate the automatic door locks 124 and lock or unlock one or more of the doors in response to user input to the key fob. The lock control module 128 may actuate the automatic door locks 124 when one or more other conditions occur. In various implementations, manual door locks may also be manually actuated by users to lock and unlock doors, respectively.

According to the present application, as discussed further below, the lock control module 128 may actuate one or more of the automatic door locks 124 and unlock one or more of the doors, respectively, in response to authentication of a rental device associated with a rental of the vehicle 108 using at least one of a camera 132 and a microphone 136 of the vehicle. For example, the rental server 112 may transmit a unique identifier (e.g., a QR code or another suitable type of visual unique identifier) to the rental device for display by the rental device. When the unique identifier is within a field of view (FOV) of the camera 132 and determined to be within a rental period of the vehicle 108 by the lock control module 128, the lock control module 128 may unlock one or more of the doors of the vehicle 108 to allow the user of the renter device to enter and use the vehicle 108. The FOV of the camera 132 is through one or more glass components of the vehicle 108, such as one or more windows (front, rear, right side, left side), one or more windshields (front or rear), and/or one or more glass top components (e.g., sunroof, moonroof, etc.). As another example, the rental server 112 may transmit a unique audible or haptic identifier (e.g., a sound or vibration profile) to the rental device for output by the rental device (e.g., via a speaker or a vibrating device). When the audible identifier is received via the microphone 136 and determined to be within a rental period of the vehicle 108 by the lock control module 128, the lock control module 128 may unlock one or more of the doors of the vehicle 108 to allow the user of the renter device to enter and use the vehicle 108. The microphone 136 may be disposed adjacent to or more of the glass components of the vehicle 108 as discussed above. While the example of vehicle rental is provided, the present application is also applicable to other types of carsharing.

Figure 2:
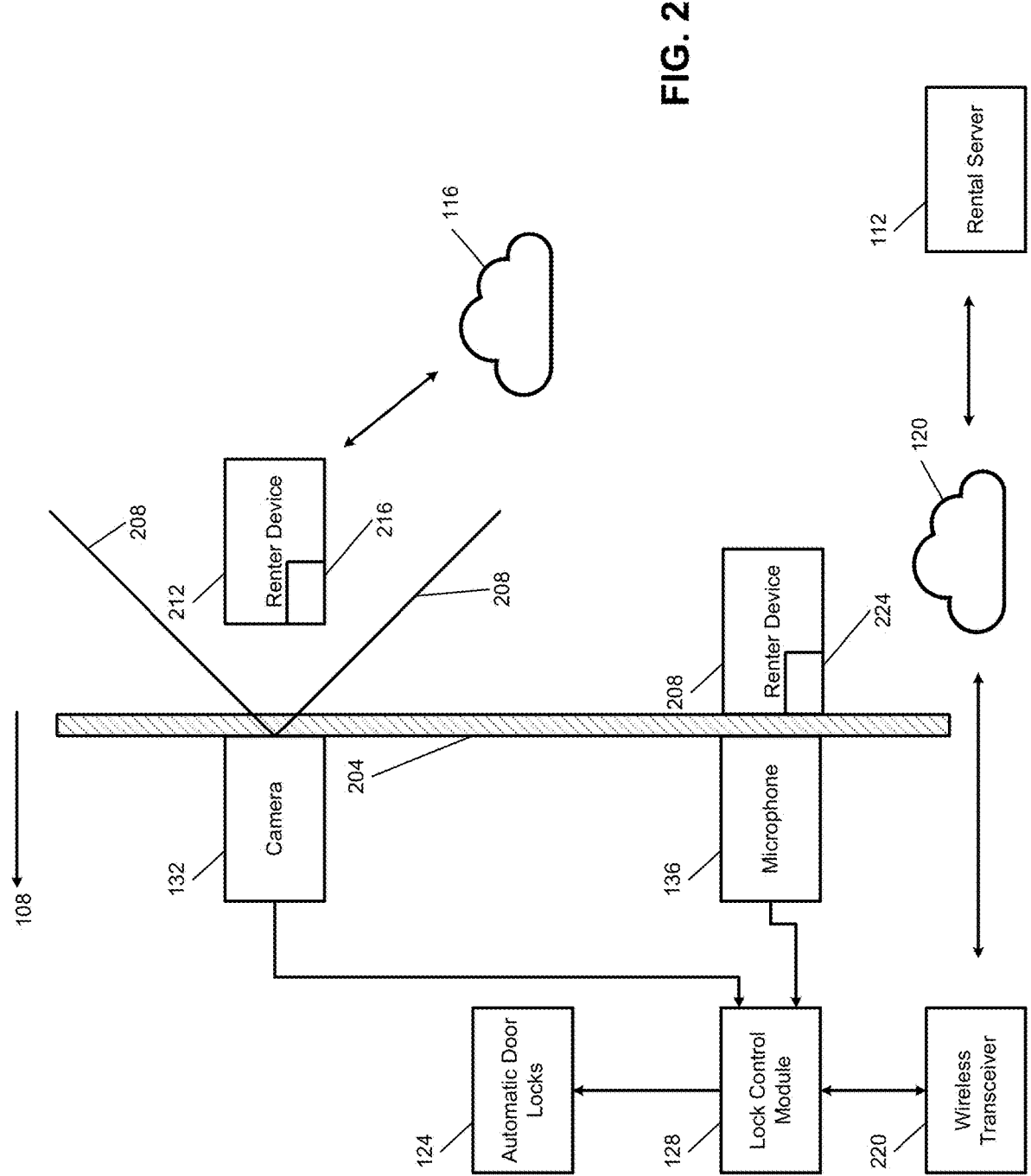
FIG. 2 is a functional block diagram of an example implementation of a lock control system of a vehicle.

FIG. 2 is a functional block diagram of an example lock control system. The vehicle 108 includes a glass component 204, such as a window, a windshield, or a roof component. While the example of a glass component is described, the present application is also applicable to other transparent components. Items to the left of the glass component 204 in FIG. 2 are components of the vehicle 108. Items to the right of the glass component 204 in FIG. 2 are external to the vehicle 108.

The camera 132 is disposed such that a FOV of the camera 132 is through the glass component 204. The camera 132 may disposed in direct contact with the glass component 204 in various implementations. An example FOV of the camera 132 is illustrated by 208 in FIG. 2.

For a rental of the vehicle 108, the rental server 112 may wirelessly transmit a visual unique identifier to a renter device 212. The renter device 212 includes a display 216, such as a touchscreen display or a non-touchscreen display. A processor module of the renter device 212 displays the visual identifier on the display 216.

The rental server 112 also wirelessly transmits the visual unique identifier of the vehicle 108. A wireless transceiver 220, such as a satellite, WiFi, or cellular transceiver of the vehicle 108 receives the visual unique identifier from the rental server 112. The rental server 112 may also transmit other information for the rental of the vehicle 108 to the vehicle 108, such as a rental date and time range for the rental of the vehicle 108.

When the visual unique identifier is displayed on the display 216 within the FOV of the camera 132, the lock control module 128 obtains the visual identifier displayed via the camera 132. The lock control module 128 may compare the visual identifier obtained via the camera 132 with the visual identifier received from the rental server 112. If the visual identifier obtained via the camera 132 is the same as the visual identifier received from the rental server 112 and the present date and time are within the rental date and time range, the lock control module 128 may actuate one or more of the automatic door locks 124 and unlock one or more of the doors, respectively, to allow a user of the renter device 212 access to the passenger cabin of the vehicle 108 and, ultimately, the key or key fob (e.g., within the glove box or console) of the vehicle 108. In various implementations, the lock control module 128 may actuate the automatic door lock 124 and unlock only the driver door of the vehicle 108. This may increase security and prevent people other than the holder of the renter device 212 from entering the vehicle 108.

Additionally or alternatively, for the rental of the vehicle 108, the rental server 112 may wirelessly transmit an audible or haptic (vibration) unique identifier to the renter device 212. The renter device 212 includes a speaker or vibrating device 224. A processor module of the renter device 212 audibly or haptically (vibrationally) outputs the audible or haptic unique identifier via the speaker or vibrating device 224.

The rental server 112 also wirelessly transmits the unique identifier the vehicle 108. The wireless transceiver 220 receives the unique identifier from the rental server 112. The rental server 112 may also transmit other information for the rental of the vehicle 108 to the vehicle 108, such as the rental date and time range for the rental of the vehicle 108.

When the unique identifier is output by the speaker or vibrating device 224, the lock control module 128 obtains the unique identifier via the microphone 136, such as when the renter device 212 is directly contacting the glass component 204. The lock control module 128 may compare the unique identifier obtained via the microphone 136 with the unique identifier received from the rental server 112. If the unique identifier obtained via the microphone 136 is the same as the unique identifier received from the rental server 112 and the present date and time are within the rental date and time range, the lock control module 128 may actuate one or more of the automatic door locks 124 and unlock one or more of the doors, respectively, to allow a user of the renter device 212 access to the passenger cabin of the vehicle 108 and, ultimately, the key or key fob (e.g., within the glove box or console) of the vehicle 108. In various implementations, the lock control module 128 may actuate the automatic door lock 124 and unlock only the driver door of the vehicle 108. This may increase security and prevent people other than the holder of the renter device 212 from entering the vehicle 108.

Figure 3:
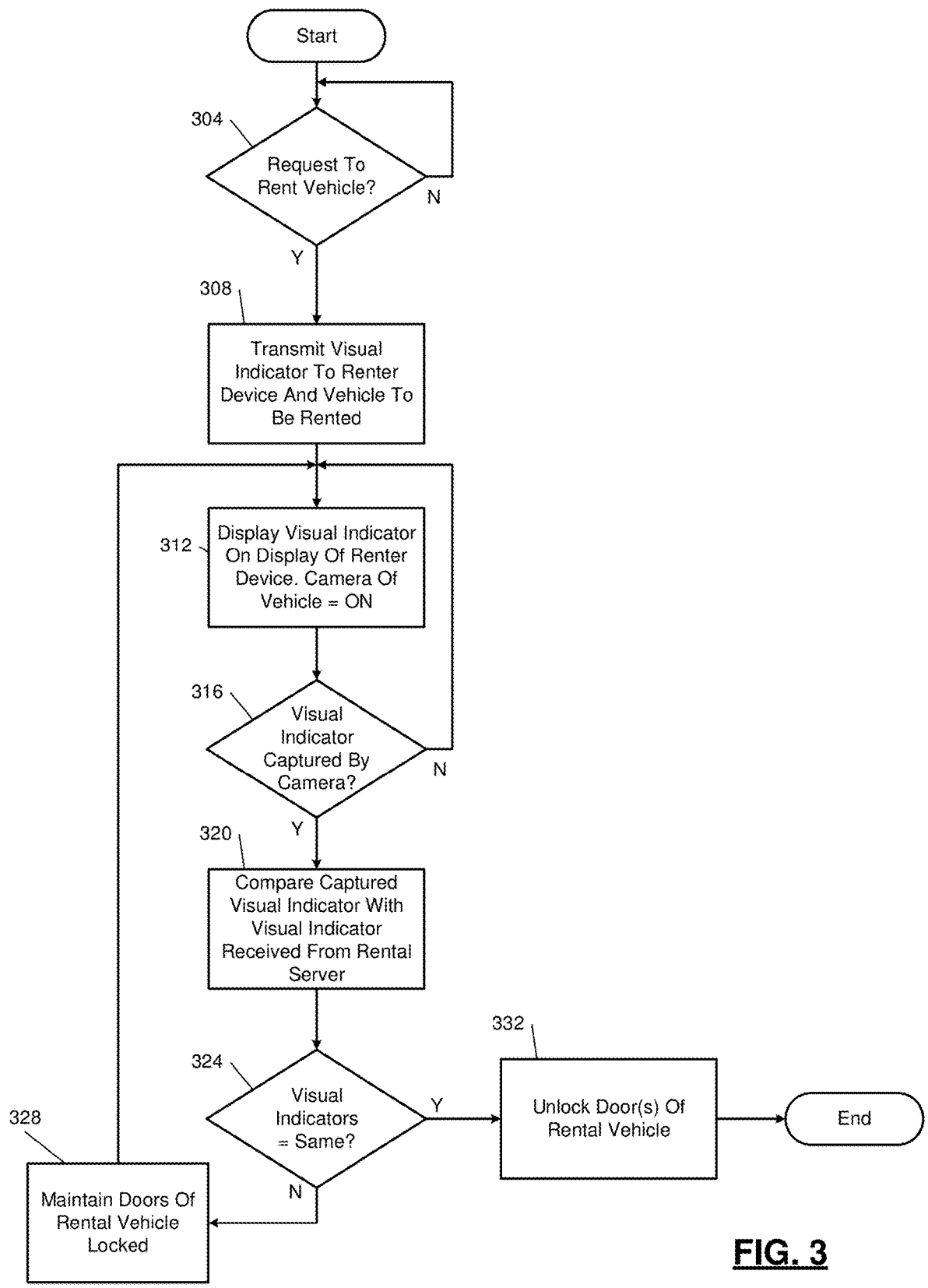
FIGS. 3 and 4 are flowcharts depicting an example method of controlling unlocking of doors of the vehicle.

FIG. 3 is a flowchart depicting an example method of controlling unlocking of doors of the vehicle 108. Control begins with 304 where the rental server 112 determines whether a request to rent the vehicle 108 for a period has been received from the renter device 212. If 304 is false, control remains at 304. If 304 is true, the rental server 112 may obtain other information for the rental, such as pickup location, drop off location, payment for the rental, payment information for the owner/manger of the vehicle 108, etc., and control continues with 308.

At 308, the rental server 112 transmits the visual unique indicator (e.g., QR code) to the renter device 212 and to the vehicle 108. At 312, the renter device 212 displays the visual indicator on the display 216. The lock control module 128 may also turn the camera 132 on when the period for the rental is within the predetermined date and time range for the rental. Turning the camera 132 off outside of the predetermined date and time range for the rental may decrease power consumption.

At 316, the lock control module 128 may determine whether a visual indicator has been captured using the camera 132. If 316 is true, control continues with 320. If 316 is false, control returns to 312. At 320, the lock control module 128 compares the visual indicator captured using the camera 132 with the visual indicator received from the rental server 112 for the rental of the vehicle 108.

At 324, the lock control module 128 determines whether the visual indicators captured and received are the same. If 324 is false, the lock control module 128 maintains the doors of the vehicle 108 locked and does not actuate the automatic door locks 124 at 328, and control returns to 312. If 324 is true, the lock control module 128 actuates one or more of the automatic door locks 124 of one or more doors at 332, and control ends.

Figure 4:
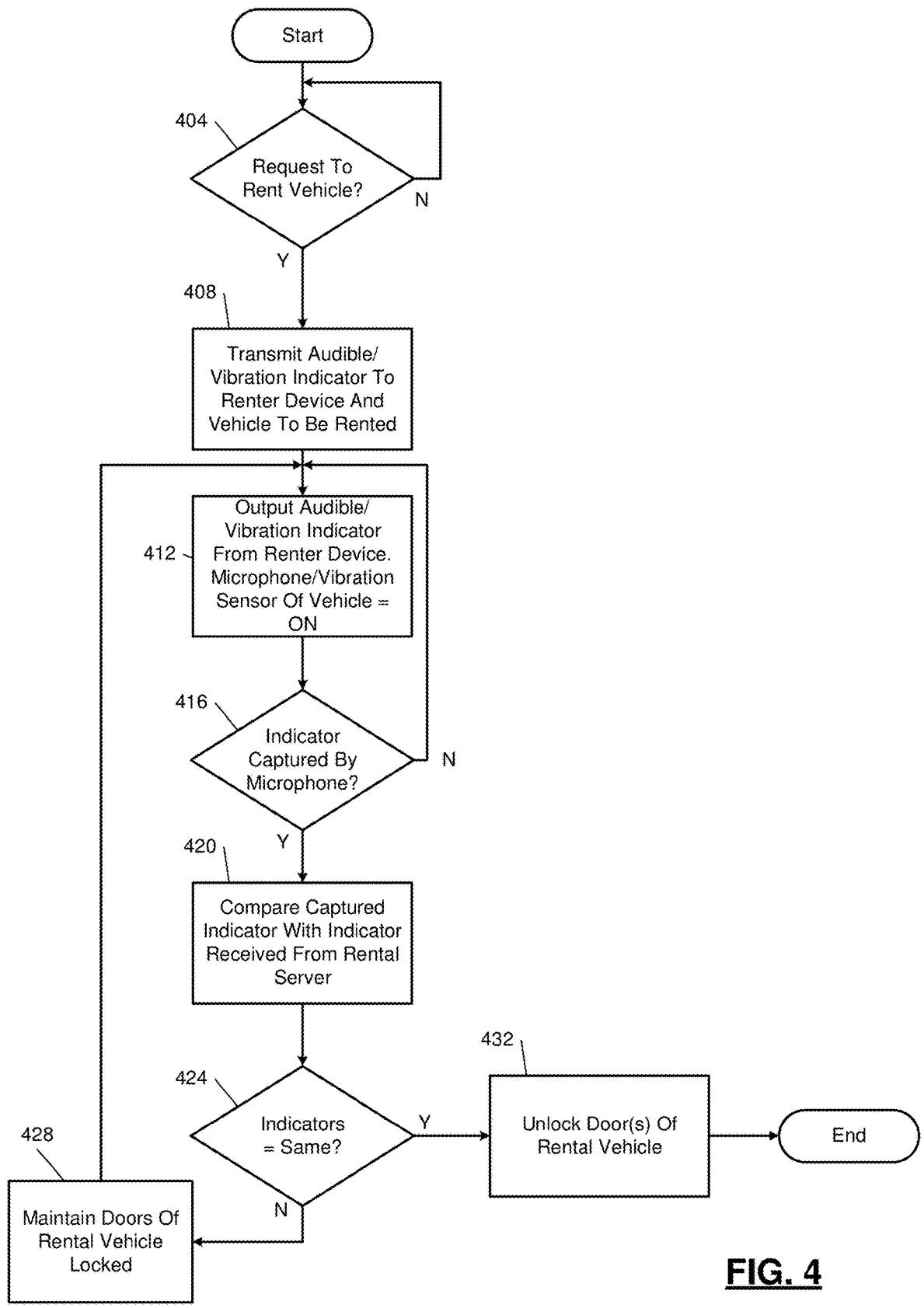

FIG. 4 is a flowchart depicting an example method of controlling unlocking of doors of the vehicle 108. Control begins with 404 where the rental server 112 determines whether a request to rent the vehicle 108 for a period has been received from the renter device 212. If 404 is false, control remains at 404. If 404 is true, the rental server 112 may obtain other information for the rental, such as pickup location, drop off location, payment for the rental, payment information for the owner/manager of the vehicle 108, etc., and control continues with 408.

At 408, the rental server 112 transmits the audible or haptic unique indicator (e.g., QR code) to the renter device 212 and to the vehicle 108. At 412, the renter device 212 outputs the audible or haptic via the speaker or vibrating device 224. The lock control module 128 may also turn the camera 132 on when the period for the rental is within the predetermined date and time range for the rental. Turning the camera 132 off outside of the predetermined date and time range for the rental may decrease power consumption.

At 416, the lock control module 128 may determine whether an audible or haptic indicator has been captured using the microphone 136. If 416 is true, control continues with 420. If 416 is false, control returns to 412. At 420, the lock control module 128 compares the audible or haptic indicator captured using the microphone 136 with the audible or haptic indicator received from the rental server 112 for the rental of the vehicle 108.

At 424, the lock control module 128 determines whether the audible or haptic indicators captured and received are the same. If 424 is false, the lock control module 128 maintains the doors of the vehicle 108 locked and does not actuate the automatic door locks 124 at 428, and control returns to 412. If 424 is true, the lock control module 128 actuates one or more of the automatic door locks 124 of one or more doors at 432, and control ends.

In a feature, a lock control system includes: an automatic door lock configured to unlock and lock a door of a vehicle; a wireless transceiver configured to wirelessly receive a first unique identifier for a period of use of the vehicle by a non-owner of the vehicle from a server that is remote from the vehicle; an input device configured to capture a second unique identifier output by an electronic device through a glass component of the vehicle; and a lock control module configured to: compare the first unique identifier with the second unique identifier; and selectively actuate the automatic door lock thereby unlocking the door in response to a determination that the second unique identifier is the same as the first unique identifier.

In further features, the first and second unique identifiers are visual identifiers.

In further features, the first and second unique identifiers are QR (quick response) codes.

In further features, the electronic device is included and is configured to display the second unique identifier on a display of the electronic device, and where the input device is a camera.

In further features, the first and second unique identifiers are audible identifiers.

In further features, the first and second unique identifiers include sounds.

In further features, the electronic device is included and is configured to output the second unique identifier from a speaker of the electronic device, where the input device includes a microphone.

In further features, the first and second unique identifiers are haptic identifiers.

In further features, the first and second unique identifiers include vibration patterns.

In further features, the electronic device is included and is configured to output the second unique identifier from a vibrating device of the electronic device, where the input device includes a microphone.

In further features, the glass component is one of a window and a windshield of the vehicle.

In further features, the lock control module is configured to selectively actuate the automatic door lock thereby unlocking the door in response to a determination that the second unique identifier is the same as the first unique identifier and a present date and time is within a predetermined date and time range for the period of use of the vehicle by the non-owner of the vehicle.

In a feature, a lock control method includes: by an automatic door lock of a vehicle, selectively unlocking and locking a door of the vehicle; by a wireless transceiver, wirelessly receiving a first unique identifier for a period of use of the vehicle by a non-owner of the vehicle from a server that is remote from the vehicle; by an input device, capturing a second unique identifier output by an electronic device through a glass component of the vehicle; comparing the first unique identifier with the second unique identifier; and selectively actuating the automatic door lock thereby unlocking the door in response to a determination that the second unique identifier is the same as the first unique identifier.

In further features, the first and second unique identifiers are visual identifiers.

In further features, the first and second unique identifiers are QR (quick response) codes.

In further features, the lock control method further includes, by the electronic device, displaying the second unique identifier on a display of the electronic device, where the input device is a camera.

In further features, the first and second unique identifiers are audible identifiers.

In further features, the first and second unique identifiers include sounds.

In further features, the lock control method further includes, by the electronic device, outputting the second unique identifier from a speaker of the electronic device, where the input device includes a microphone.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A lock control system, comprising:
    an automatic door lock configured to unlock and lock a door of a vehicle;
    a wireless transceiver configured to wirelessly receive a first unique identifier for a period of use of the vehicle by a non-owner of the vehicle from a server that is remote from the vehicle;
    an input device configured to capture a second unique identifier output by an electronic device through a glass component of the vehicle,
    wherein the first and second unique identifiers are one of audible identifiers and haptic identifiers; and
    a lock control module configured to:
        compare the first unique identifier with the second unique identifier; and
        selectively actuate the automatic door lock thereby unlocking the door in response to a determination that the second unique identifier is the same as the first unique identifier.

2. The lock control system of claim 1 wherein the first and second unique identifiers are audible identifiers.

3. The lock control system of claim 2 wherein the first and second unique identifiers include sounds.

4. The lock control system of claim 2 further comprising the electronic device,
    wherein the electronic device is configured to output the second unique identifier from a speaker of the electronic device, and
    wherein the input device includes a microphone.

5. The lock control system of claim 1 wherein the first and second unique identifiers are haptic identifiers.

6. The lock control system of claim 5 wherein the first and second unique identifiers include vibration patterns.

7. The lock control system of claim 5 further comprising the electronic device,
- wherein the electronic device is configured to output the second unique identifier from a vibrating device of the electronic device, and
- wherein the input device includes a microphone.

8. The lock control system of claim 1 wherein the glass component is one of a window and a windshield of the vehicle.

9. The lock control system of claim 1 wherein the lock control module is configured to selectively actuate the automatic door lock thereby unlocking the door in response to a determination that the second unique identifier is the same as the first unique identifier and a present date and time is within a predetermined date and time range for the period of use of the vehicle by the non-owner of the vehicle.

10. A lock control method, comprising:
- by an automatic door lock of a vehicle, selectively unlocking and locking a door of the vehicle;
- by a wireless transceiver, wirelessly receiving a first unique identifier for a period of use of the vehicle by a non-owner of the vehicle from a server that is remote from the vehicle;
- by an input device, capturing a second unique identifier output by an electronic device through a glass component of the vehicle,
- wherein the first and second unique identifiers are one of audible identifiers and haptic identifiers;
- comparing the first unique identifier with the second unique identifier; and
- selectively actuating the automatic door lock thereby unlocking the door in response to a determination that the second unique identifier is the same as the first unique identifier.

11. The lock control method of claim 10 wherein the first and second unique identifiers are audible identifiers.

12. The lock control method of claim 11 wherein the first and second unique identifiers include sounds.

13. The lock control method of claim 11 further comprising:
- by the electronic device, outputting the second unique identifier from a speaker of the electronic device,
- wherein the input device includes a microphone.

14. The lock control method of claim 10 wherein the first and second unique identifiers are haptic identifiers.

\* \* \* \* \*